July 18, 1950  J. W. FARKAS  2,516,053
GAUGE SUPPORT
Filed Jan. 4, 1946  2 Sheets-Sheet 1

INVENTOR.
John W. Farkas
BY Barthel + Bugbee
ATTY'S

July 18, 1950 J. W. FARKAS 2,516,053
GAUGE SUPPORT
Filed Jan. 4, 1946 2 Sheets-Sheet 2
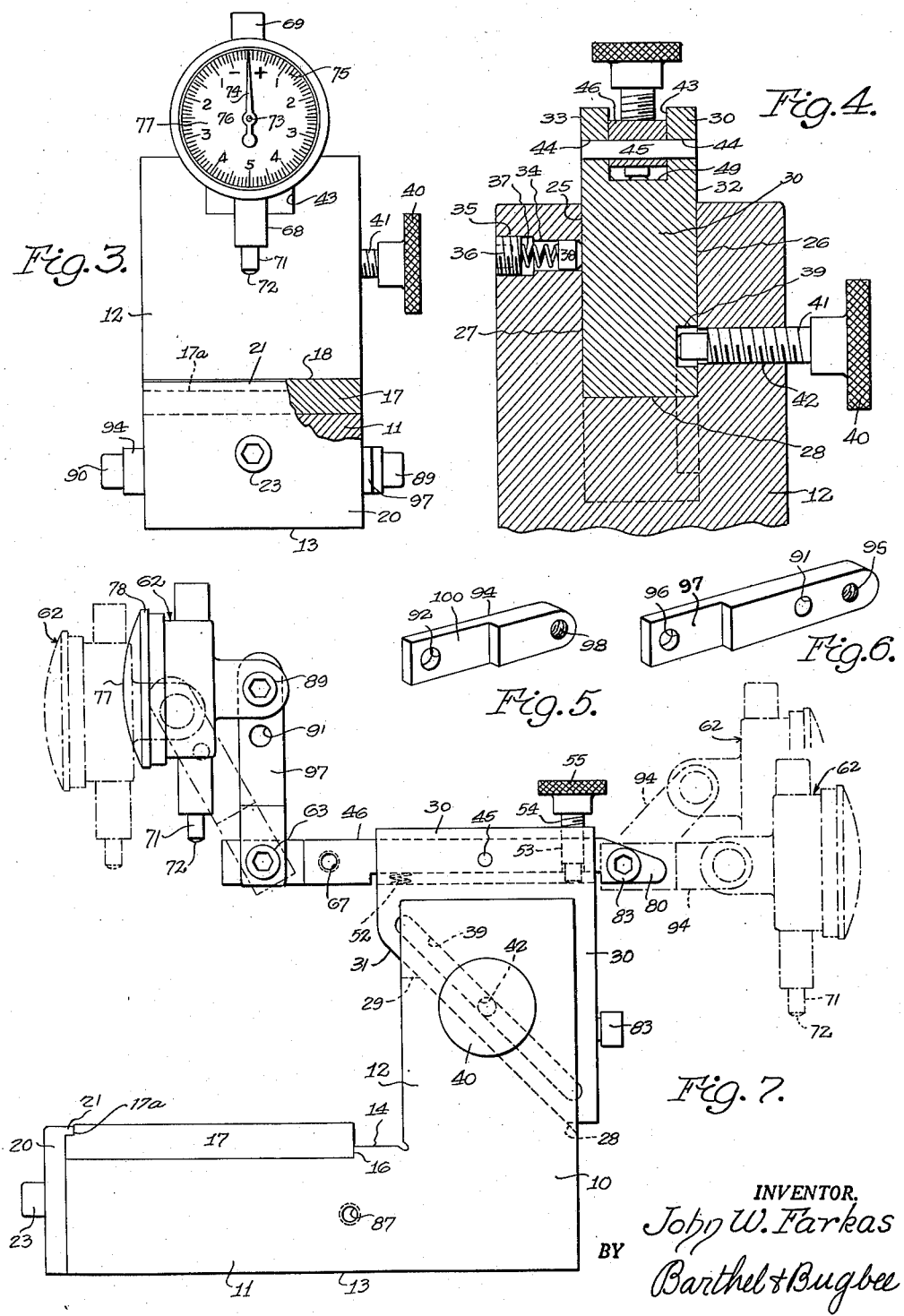
INVENTOR.
John W. Farkas
BY Barthel & Bugbee
ATT'YS Patented July 18, 1950

2,516,053

UNITED STATES PATENT OFFICE 2,516,053

GAUGE SUPPORT

John W. Farkas, Detroit, Mich., assignor of twenty-four and one-half per cent to Donald S. Cornell and twenty-four and one-half per cent to Earle D. Tempel, both of Detroit, Mich.

Application January 4, 1946, Serial No. 639,112

6 Claims. (Cl. 248—124)

This invention relates to instrument supports, and in particular to supports for gauges used in precision mechanical measurements.

One object of this invention is to provide a gauge support capable of adapting a dial gauge to measure a wide range of objects of widely varying dimensions.

Another object is to provide a gauge support which may be quickly and easily adjusted from a position for the measurement of small objects to a position for the measurement of large objects and vice versa.

Another object is to provide a gauge support wherein a dial gauge cooperates with a surface plate mounted on a support and is carried by an obliquely movable slide which is quickly adjustable from one extreme position to the other.

Another object is to provide a gauge support as set forth in the object immediately preceding wherein the slide carries a pivoted arm with provision at both ends for detachably mounting a dial gauge so that objects may be measured while placed on the gauge support or to one side of it.

Another object is to provide a gauge support as set forth in the two preceding objects wherein adapters are provided for still further increasing the range of the instrument.

Another object is to provide a gauge support as set forth in the three preceding objects wherein the gauge carrying arm is adjustable around its pivot by means of a micrometer screw.

Another object is to provide a gauge support as set forth in the four preceding objects wherein the slide is adjustably held in any position by a yieldingly urged friction member and may be additionally and positively clamped after being moved to any desired position.

Other objects and advantages of the invention will become apparent during the course of the following description of the accompanying drawings, wherein:

Figure 3 is a front elevation of the gauge support shown in Figure 1 with a portion broken away to show the relationship of the surface plate to the base of the instrument;

Figure 4 is a vertical section along the line 4—4 in Figure 1;

Figures 5 and 6 are perspective views of two adapters used to increase the range of the instruments; and Figure 7 is a side elevation of the instrument showing the adapters of Figures 5 and 6 in use for extending the range of the instrument.

Figure 1:
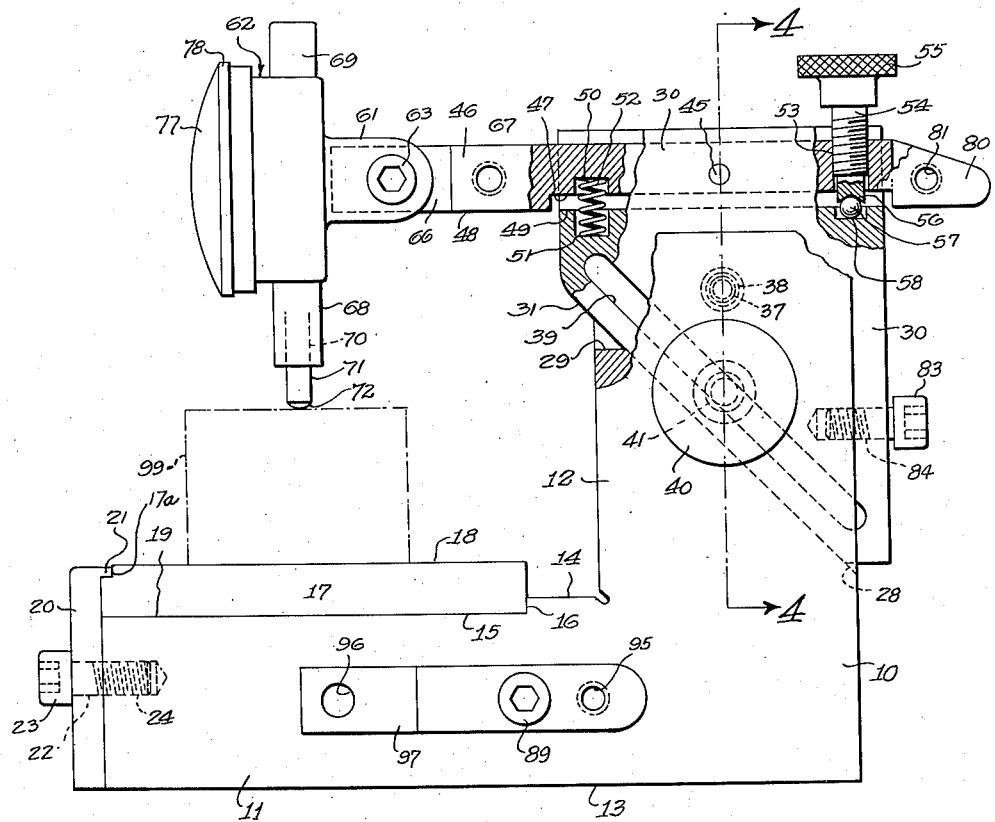
Figure 1 is a side elevation of a gauge support according to a preferred embodiment of the invention, partly broken away to show the internal construction more clearly.

Referring to the drawings in detail, Figure 1 shows a preferred embodiment of the gauge support of this invention as consisting of an L-shaped member 10 having a horizontal base portion 11 and an upright portion 12. The base portion 11 is of preferably rectangular shape with a bottom surface 13 and top surface 14 which is provided with a slightly recessed flat surface 15 separated from the top surface 14 by a transverse shoulder 16. The bottom surface 13 and the recessed top surface 15 are flat to a high degree of precision and are scraped accurately with reference to high precision surface plates by the aid of Prussian blue to a high degree of flatness.

Mounted in and upon the recessed flat surface 15 is a surface plate 17 having upper and lower surfaces 18 and 19 which are likewise scraped to a high degree of flatness by the aid of Prussian blue and precision surface plates, and which are also made parallel to a high degree of precision. The surface plate 17 is secured in the recess formed by the top surface 15 and the shoulder 16 by a plate 20 having an overhanging flange 21 engaging a recess 17a in the forward top edge of the upper surface 18 of the surface plate 17. The plate 20 is provided with a bore 22 through which passes a set screw 23 threaded into a bore 24 in the base portion 11 of the L-shaped member 10.

The upright portion 12 of the L-shaped member 10 is provided with a vertical groove 25 (Figure 4) having parallel flat sides 26 and 27 and a flat inclined bottom surface 28, the angle of inclination being preferably 45 degrees to the horizontal. At its upper end the inclined surface 28 terminates in a short horizontal portion 29 (Figure 1). Slidably mounted in the vertical groove 25 is a block 30 of roughly triangular shape and having an inclined bottom surface 31 of the same angle of inclination as the bottom surface 28 and slidably engaging the latter. The block 30 is provided with side walls 32 and 33 slidably engaging the side walls 26 and 27 of the groove 25. The block 30 is accurately and smoothly fitted into the groove 25 by precise scraping methods or other precise machining methods so that it slides up or down in an oblique direction without perceptible wobble. The upright portion 12 is provided with a transverse bore 34 (Figure 4) having a threaded portion 35 adapted to receive a screw plug 36 which serves as an abutment for a coil spring 37, the inner end of which engages a friction plug 38 and urges the latter into frictional engagement with the side 33 of the block 30, thereby yieldingly holding the latter in any desired position of adjustment. The side 32 of the block 30 is provided with an upwardly inclined groove 39 (Figure 4) parallel with the inclined bottom surface 31 of the block 30 and having its bottom surface engaged by the inner end of a thumb screw 40 serving as a clamping screw and having a threaded shank 41 threaded through the threaded bore 42 in the upright portion 12. By this construction, with the clamping screw 40 screwed out of engagement with the groove 39, the block 30 may be slid up or down in the groove 25 and will be held at any position, when released, by the yieldingly urged friction plug 38 engaging its surface 33. The clamping screw 40 may then be tightened to positively hold the block 30 in its adjusted position.

The top of the block 30 is provided with a slot 43 (Figure 4) which is crossed by transverse aligned bores 44 within which is mounted a pivot pin 45. Pivotally mounted upon the pivot pin 45 is an arm 46 having a recessed portion 47 (Figure 1) extending upwardly from its bottom surface 48 (Figure 1). The recessed portion 47 and the bottom 49 of the groove slot 43 are provided with spring sockets 50 and 51 respectively, these serving to receive a compression spring 52 which tends to urge the forward portion of the arm 46 upwardly about its pivot pin 45. Near its rearward end, the arm 46 is provided with a threaded vertical bore 53 (Figure 1) into which is threaded a micrometer screw 54 having a knurled head 55 and a concave conical lower end 56 engaging a steel ball 57 mounted in a socket 58 in the bottom 49 of the slot 43. The micrometer screw 54 and the bore 53 are provided with very fine instrument threads whereby the arm 46 may be very precisely swung about its pivot pin 45 by turning the micrometer screw 54.

The forward end of the arm 46 is cut away vertically as at 59 to provide a recessed surface 60 which is engaged by the inner surface of the bracket portion 61 of the dial gauge 62, these parts being held together by a set screw 63 threaded through the bore 64 in the bracket portion 61 into the threaded bore 65 in the forward portion 66 of the arm 46. Immediately behind the threaded bore 65, the arm 46 is provided with another threaded bore 67.

The dial gauge 62 is provided with a downwardly extending bushing 68 and an upwardly extending boss 69 having a bore 70 therein (Figure 1) adapted to receive a reciprocating plunger 71 having a curved contact end 72. The plunger 71 is connected through precision gearing to a shaft 73 upon which is mounted a needle 74 registering with graduations 75 upon a dial 76. The dial 76 is ordinarily divided into graduations 75 of thousandths of an inch and is protected by a glass or plastic crystal 77 held in place by a bezel 78. The dial indicator 62 is of a conventional type well known to those skilled in the mechanical art and its details form no part of the present invention.

Figure 2:
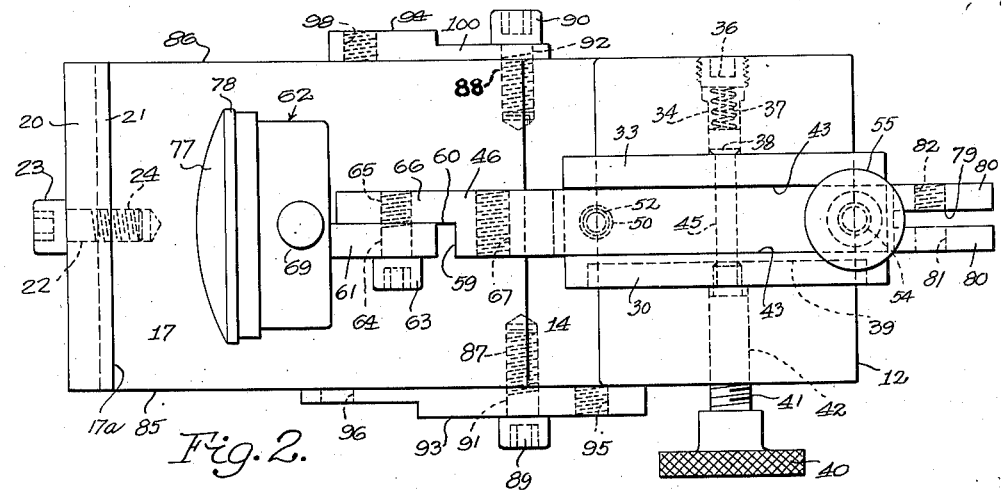
Figure 2 is a top plan view of the gauge support shown in Figure 1.

The rearward end of the arm 46 is slotted as at 79 to provide side arms 80 through which pass transverse bores 81 and 82, the bore 82 being threaded. These bores receive a set screw 83 which, when not being used, is threaded into a bore 84 in the back of the block 30 (Figure 1) so as to be conveniently accessible when needed, yet thereby protected from being mislaid or lost. Similarly, the opposite sides 85 and 86 of the horizontal portion 11 (Figure 2) are provided with threaded bores 87 and 88 which receive set screws 89 and 90 passing through bores 91 and 92 in adapter arms 93 and 94 and serving likewise to hold these in accessible positions when needed as well as to protect them against being mislaid or lost. The adapter arm 93 is provided at one end with a threaded bore 95 and at its opposite end with a plain bore 96 in a recessed portion 97. Similarly, the adapter arm 94 is provided at one end with a threaded bore 98 for receiving the set screw 83 when the bore 92 is aligned with the bores 81 and 82.

In the operation of the invention, the clamping screw 40 is loosened and the block 30 is pushed upward or downward in its groove 25 until the plunger 71 of the dial gauge 62 is in a suitable position for measuring the work piece 99 placed upon the upper surface 18 of the surface plate 17. The clamping screw 40 is then tightened in this adjusted position. The dial indicator 62 is then adjusted to read the accurate distance between the bottom 72 of its plunger and the upper surface 18 of the surface plate 17 by any suitable means such as by the use of a stack of precision gauge blocks, employing the usual precaution regarding heat and cleanliness commonly used with such blocks. With the dial 77 thus set, the instrument may be used to take successive readings upon objects placed upon the surface plate 17. Round or cylindrical objects may be gauged by mounting a precision V-block upon the recessed surface 15 in place of the surface plate 17, or on top of the surface plate 17. A precision adjustment of the dial gauge 62 vertically is obtained by turning the micrometer screw 54, thereby swinging the arm 46 upward or downward around its pivot pin 45. At the bottom of the travel of the block 30, the cut-away portion 29 provides a space for receiving the arm 46.

The range of the instrument may be increased by unscrewing the set screw 63 and removing the dial indicator 62, inserting the adapter 93 in its place, in the manner shown in Figure 7, the dial indicator 62 being replaced and clamped by the set screw 89 in the upper hole 95 or intermediate hole 91 of the adapter 93. By loosening the set screws 63 and 89 (Figure 7), the dial indicator 62 may be swung into different positions, such as the one shown in chain lines, thereby placing the bottom 72 of the dial indicator plunger 71 at any desired elevation within the range of the instrument.

To measure objects to one side of the instrument, the dial indicator 62 may be removed from the forward end of the arm 46 in the manner previously described, placed between the side arms 80 in the slot 79 at the rearward end of the arm 46 and clamped therein by inserting the set screw 83 through the bore 81 into the threaded bore 82 and tightening the same. To give the instrument greater range, it is preferable to insert the recessed portion 100 of the adapter 94 in the slot 79 between the side arms 80 (Figure 2) and clamp it in position by means of the set screw 83 in the manner just described. The dial indicator is then clamped to the other end of the adapter arm 94 by inserting the set screw 63 through the bore 74 of the dial indicator into the threaded bore 98 of the adapter arm 94. The dial indicator 62 may then be swung into various positions, such as the two shown in chain lines in Figure 7, in order to vary the position of the bottom 72 of the plunger 71 according to the type of work piece being measured.

While I have shown and described my invention in detail, it is to be understood that the same is to be limited only by the appended claims, for many changes may be made without departing from the spirit and scope of my invention.

What I claim is:

1. A gauge support for holding a dial gauge comprising a base, an upright member connected to said base and having an upwardly-inclined guide surface thereon, a movable member adjustably mounted on said upright member and having an upwardly inclined surface slidably engaging said guide surface and movable therealong in an inclined direction, a clamping device mounted on said upright member and clampingly securing said movable member in its adjusted position, a gauge holder mounted on said movable member, and a fine adjustment mechanism interconnecting said gauge holder and said movable member.

2. A gauge support for holding a dial gauge, comprising a base, an upright member connected to said base and having an upwardly-inclined guide surface thereon, a movable member adjustably mounted on said upright member and having an upwardly inclined surface slidably engaging said guide surface and movable therealong in an inclined direction, a clamping device mounted on said upright member and clampingly securing said movable member in its adjusted position, a gauge holder mounted on said movable member, a fine adjustment mechanism interconnecting said gauge holder and said movable member, and a yieldingly urged frictional element engaging and holding said movable member in its unclamped position.

3. A gauge support for holding a dial gauge, comprising a base, an upright member connected to said base and having an upwardly-inclined guide surface thereon, a movable member adjustably mounted on said upright member and having an upwardly inclined surface slidably engaging said guide surface and movable therealong in an inclined direction, a clamping device mounted on said upright member and clampingly securing said movable member in its adjusted position, a gauge holder mounted on said movable member, said gauge holder having attachment portions near the opposite ends of said gauge holder for securing a dial gauge thereto, and a fine adjustment mechanism interconnecting said gauge holder and said movable member in its unclamped position.

4. A gauge support for holding a dial gauge, comprising a base, an upright member connected to said base, a movable member, one of said members having an upwardly-inclined portion and the other member having an upwardly inclined recess slidably receiving said upwardly inclined portion, means for clamping one of said members in an adjusted position relatively to the other member, and a gauge holder on said movable member.

5. A gauge support for holding a dial gauge, comprising a base, an upright member connected to said base, a movable member, one of said members having an upwardly-inclined portion and the other member having an upwardly inclined recess slidably receiving said upwardly inclined portion, one of said members having an elongated portion therein parallel to the direction of motion of said movable member, a clamping device on one of said members clampingly engaging said elongated portion, and a gauge holder on said movable member.

6. A gauge support for holding a dial gauge comprising a base, an upright member connected to said base and having an upwardly inclined guide surface thereon, a movable member adjustably mounted on said upright member and having an upwardly inclined surface slidably engaging said guide surface and movable therealong in an inclined direction, a clamping device mounted on said upright member and clampingly securing said movable member in its adjusted position, and a gauge holder mounted on said movable member.

JOHN W. FARKAS.

REFERENCES CITED

The following references are of record in the file of this patent:

UNITED STATES PATENTS

| Number | Name | Date |
| --- | --- | --- |
| 2,124,006 | Parker | July 19, 1938 |
| 2,177,399 | Aller | Oct. 24, 1939 |
| 2,219,370 | Pierce | Oct. 29, 1940 |
| 2,267,583 | Carroll | Dec. 23, 1941 |
| 2,354,046 | Oslund | July 18, 1944 |